United States Patent
Berding et al.

(10) Patent No.: US 8,451,559 B1
(45) Date of Patent: May 28, 2013

(54) DISK DRIVE HAVING A BASE WITH A PROTRUDING PERIPHERAL METAL FLANGE THAT IS FOLDED OVER A TOP COVER TO ENCLOSE HELIUM

(75) Inventors: Keith R. Berding, San Jose, CA (US); Sudha Narayan, San Jose, CA (US); Robert B. Burkhart, Morgan Hill, CA (US); Thomas J. Hitchner, San Martin, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/358,427

(22) Filed: Jan. 25, 2012

(51) Int. Cl.
*G11B 15/18* (2006.01)

(52) U.S. Cl.
USPC .................................... 360/99.21

(58) Field of Classification Search
USPC ........... 360/99.21, 99.22, 99.25, 99, 8, 97.13, 360/97.14, 97.22; 720/649
See application file for complete search history.

(56) References Cited

U.S. PATENT DOCUMENTS

| | | | |
|---|---|---|---|
| 5,097,978 A | 3/1992 | Eckerd | |
| 5,270,887 A | 12/1993 | Edwards et al. | |
| 5,276,577 A | 1/1994 | Brooks et al. | |
| 5,454,157 A | 10/1995 | Ananth et al. | |
| 5,600,509 A | 2/1997 | Kawakami | |
| 5,646,801 A | 7/1997 | Boigenzahn et al. | |
| 6,185,807 B1 | 2/2001 | Kazmierczak et al. | |
| 6,266,207 B1 | 7/2001 | Iwahara et al. | |
| 6,347,021 B2 | 2/2002 | Kazmierczak et al. | |
| 6,392,838 B1 | 5/2002 | Hearn et al. | |
| 6,525,899 B2 | 2/2003 | Hearn et al. | |
| 6,556,372 B2 | 4/2003 | Hearn et al. | |
| 6,631,049 B2 | 10/2003 | Satoh et al. | |
| 6,721,128 B1 * | 4/2004 | Koizumi et al. | 360/99.21 |
| 6,822,823 B1 | 11/2004 | Tsuwako et al. | |
| 6,903,898 B2 | 6/2005 | Nonaka et al. | |
| 6,970,322 B2 | 11/2005 | Bernett | |
| 6,989,493 B2 | 1/2006 | Hipwell, Jr. et al. | |
| 7,016,145 B2 | 3/2006 | Gunderson et al. | |
| 7,019,942 B2 | 3/2006 | Gunderson et al. | |
| 7,123,440 B2 | 10/2006 | Albrecht et al. | |
| 7,355,811 B1 | 4/2008 | Gifford et al. | |
| 7,365,937 B2 | 4/2008 | Gunderson | |
| 7,434,987 B1 | 10/2008 | Gustafson et al. | |
| 7,518,859 B2 * | 4/2009 | Kobayashi | 361/679.34 |
| 7,522,375 B2 | 4/2009 | Tsuda et al. | |
| 7,599,147 B2 | 10/2009 | Gunderson | |
| 8,194,348 B2 | 6/2012 | Jacoby et al. | |
| 2001/0044023 A1 | 11/2001 | Johnson et al. | |
| 2003/0081348 A1 | 5/2003 | Watanabe et al. | |
| 2003/0179489 A1 | 9/2003 | Bernett et al. | |
| 2005/0068666 A1 | 3/2005 | Albrecht et al. | |
| 2005/0184463 A1 | 8/2005 | Boutaghou et al. | |
| 2005/0253343 A1 | 11/2005 | Hampton | |

(Continued)

*Primary Examiner* — Allen T Cao

(57) ABSTRACT

A novel disk drive enclosure includes a disk drive base having a bottom portion and four side walls that define a cavity therebetween. At least one disk is mounted in the cavity. The disk drive also includes a top seal that includes a peripheral portion that overlies each of the four side walls and a central portion that spans the cavity. A metal flange protrudes from all four side walls of the disk drive base, and is folded over the peripheral portion of the top seal along all four side walls. The top seal is continuously adhered to the metal flange along an entire length of all four side walls. The disk drive enclosure encloses helium gas.

20 Claims, 4 Drawing Sheets

U.S. PATENT DOCUMENTS

| | | |
|---|---|---|
| 2006/0002005 A1 | 1/2006 | Miyazaki et al. |
| 2006/0034010 A1 | 2/2006 | Abe et al. |
| 2007/0035872 A1 | 2/2007 | Hayakawa et al. |
| 2007/0183085 A1 | 8/2007 | Hatchett et al. |
| 2007/0263319 A1 | 11/2007 | Calderon et al. |
| 2007/0278909 A1* | 12/2007 | Xu et al. .................... 310/68 R |
| 2008/0007866 A1 | 1/2008 | Hayakawa et al. |
| 2008/0068745 A1 | 3/2008 | Uefune et al. |
| 2008/0088969 A1* | 4/2008 | Uefune et al. ............ 360/97.02 |
| 2008/0165448 A1 | 7/2008 | Ichikawa et al. |
| 2008/0165449 A1 | 7/2008 | Shindo et al. |
| 2008/0247082 A1* | 10/2008 | Kavosh et al. ............ 360/97.02 |
| 2009/0097163 A1 | 4/2009 | Suzuki et al. |
| 2009/0102131 A1 | 4/2009 | Gunderson |
| 2009/0168233 A1 | 7/2009 | Kouno et al. |
| 2009/0241322 A1* | 10/2009 | Uefune et al. ............ 29/603.01 |
| 2011/0051287 A1* | 3/2011 | Tokunaga .................... 360/133 |
| 2011/0211279 A1* | 9/2011 | Jacoby et al. ............ 360/97.02 |

\* cited by examiner

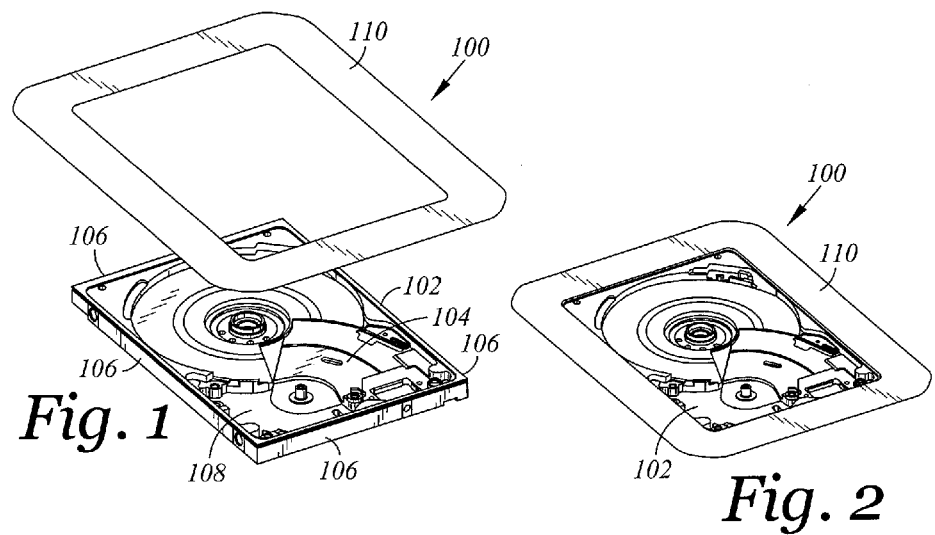
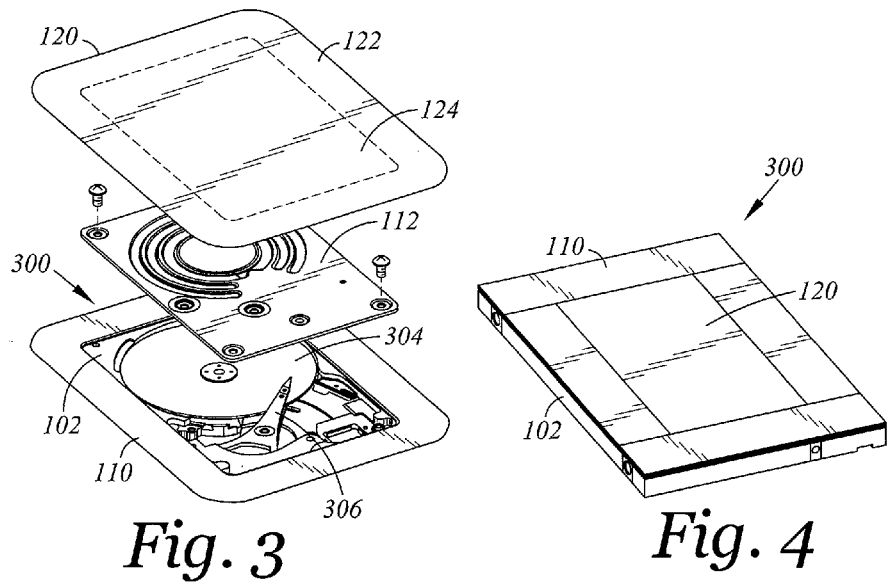

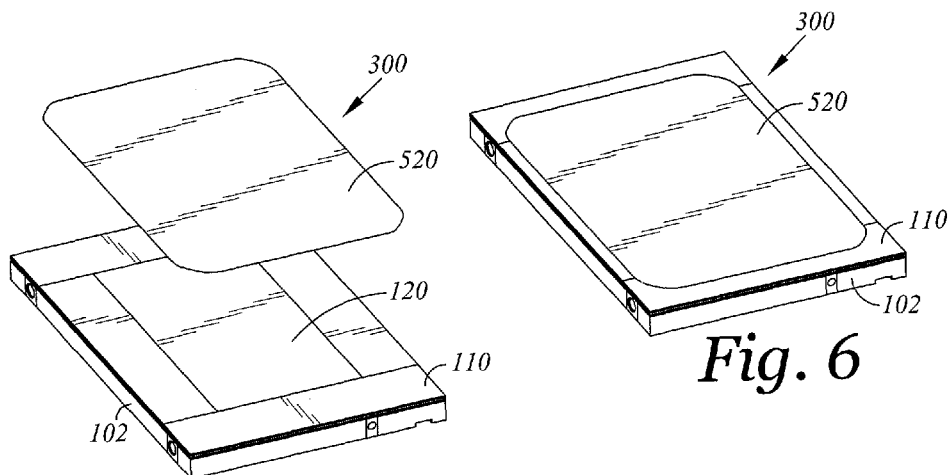
Fig. 5
Fig. 6
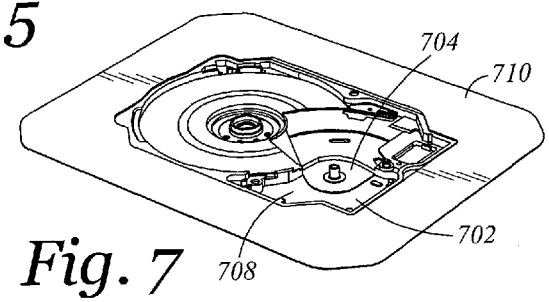
Fig. 7
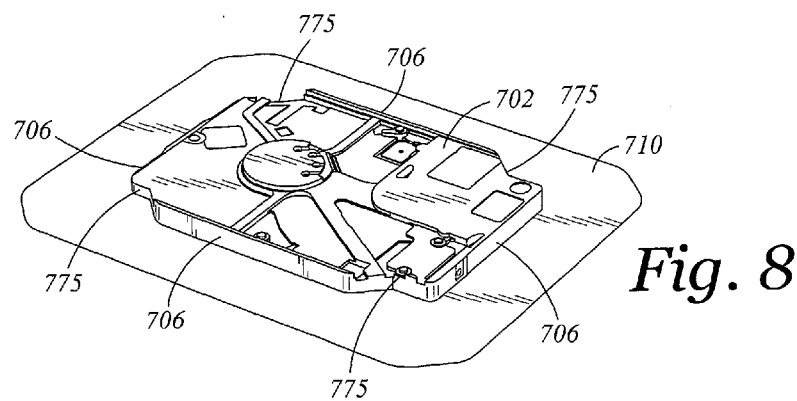
Fig. 8

DISK DRIVE HAVING A BASE WITH A PROTRUDING PERIPHERAL METAL FLANGE THAT IS FOLDED OVER A TOP COVER TO ENCLOSE HELIUM

BACKGROUND

The typical hard disk drive includes a head disk assembly (HDA) and a printed circuit board assembly (PCBA) attached to a disk drive base of the HDA. The HDA includes at least one disk (such as a magnetic disk, magneto-optical disk, or optical disk), a spindle motor for rotating the disk, and a head stack assembly (HSA). The PCBA includes electronics and firmware for controlling the rotation of the spindle motor and for controlling the position of the HSA, and for providing a data transfer channel between the disk drive and its host.

The spindle motor typically includes a rotor including one or more rotor magnets and a rotating hub on which disks are mounted and clamped, and a stator. If more than one disk is mounted on the hub, the disks are typically separated by spacer rings that are mounted on the hub between the disks. Various coils of the stator are selectively energized to form an electromagnetic field that pulls/pushes on the rotor magnet(s), thereby rotating the hub. Rotation of the spindle motor hub results in rotation of the mounted disks.

The HSA typically includes an actuator, at least one head gimbal assembly (HGA), and a flex cable assembly. During operation of the disk drive, the actuator rotates to position the HGAs adjacent desired information tracks on the disk. The actuator typically includes a pivot-bearing cartridge to facilitate such rotational positioning. The pivot-bearing cartridge typically fits into a bore in the body of the actuator. One or more actuator arms extend from the actuator body. An actuator coil is supported by the actuator body, and is disposed opposite the actuator arms. The actuator coil is configured to interact with one or more fixed magnets in the HDA, to form a voice coil motor. The PCBA provides and controls an electrical current that passes through the actuator coil and results in a torque being applied to the actuator.

Each HGA includes a head for reading and writing data from and to the disk. In magnetic recording applications, the head typically includes a slider and a magnetic transducer that comprises a writer and a read element. In optical recording applications, the head may include a minor and an objective lens for focusing laser light on to an adjacent disk surface. The slider is separated from the disk by a gas lubrication film that is typically referred to as an "air bearing." The term "air bearing" is common because typically the lubricant gas is simply air. However, air bearing sliders have been designed for use in disk drive enclosures that contain helium, because an inert gas may not degrade lubricants and protective carbon films as quickly as does oxygen. Helium may also be used, for example, because it has higher thermal conductivity than air, and therefore may improve disk drive cooling. Also, because the air bearing thickness depends on the gas viscosity and density, the air bearing thickness may be advantageously reduced in helium relative to air (all other conditions being the same). Furthermore, because helium has lower density than air, its flow (e.g. flow that is induced by disk rotation) may not buffet components within the disk drive as much, which may reduce track misregistration and thereby improve track following capability—facilitating higher data storage densities.

Disk drive enclosures disclosed in the art to contain helium are typically hermetically sealed to prevent an unacceptable rate of helium leakage. Although some negligible amount of helium leakage is unavoidable, a non-negligible amount of helium leakage is undesirable because it can alter the thickness of the gas lubrication film between the head and the disk, and thereby affect the performance of the head. A non-negligible amount of helium leakage is also undesirable because it can alter the tribochemistry of the head disk interface, possibly leading to degradation in reliability, head crashes, and associated data loss.

Various methods and structures that have been disclosed in the past to hermetically seal disk drive enclosures have been too costly, have required too much change to existing disk drive manufacturing processes, and/or were not able to retain helium internal to the disk drive enclosure for sufficient time to ensure adequate product reliability. Some relatively successful methods and structures for sealing 3.5 inch form-factor disk drives may not be practical or feasible for sealing smaller form-factor disk drives, such as 2.5 inch form-factor disk drives. Thus, there is a need in the art for disk drive enclosure sealing methods and structures that may be practically implemented in a high volume and low cost disk drive manufacturing process, and that can retain helium internal to a small form-factor disk drive enclosure for a sufficient period of time to ensure adequate post-manufacture product reliability and lifetime.

BRIEF DESCRIPTION OF THE DRAWINGS

FIG. 1 depicts a partial disk drive enclosure with a peripheral flange exploded from the disk drive base, according to an embodiment of the present invention.

FIG. 2 is a top perspective view of the partial disk drive enclosure of FIG. 1, except with the peripheral flange attached to the disk drive base.

FIG. 3 is an exploded top perspective view of a disk drive according to an embodiment of the present invention, with a peripheral flange that protrudes from all four sides of the disk drive base, and a top seal shown exploded from the peripheral flange.

FIG. 4 shows the disk drive of FIG. 3, with the top seal attached to the peripheral flange, and the top seal and peripheral flange together folded according to an embodiment of the present invention.

FIG. 5 is a top perspective view of the disk drive of FIG. 4, with a top cover label exploded from the folded top seal and peripheral flange.

FIG. 6 shows the disk drive of FIG. 5, except with the top cover label affixed to the folded top seal and peripheral flange.

FIG. 7 is a top perspective view of a disk drive base with a peripheral flange according to another embodiment of the present invention.

FIG. 8 is a bottom perspective view of the disk drive base of FIG. 7.

DESCRIPTION OF THE PREFERRED EMBODIMENTS

Figure 9:
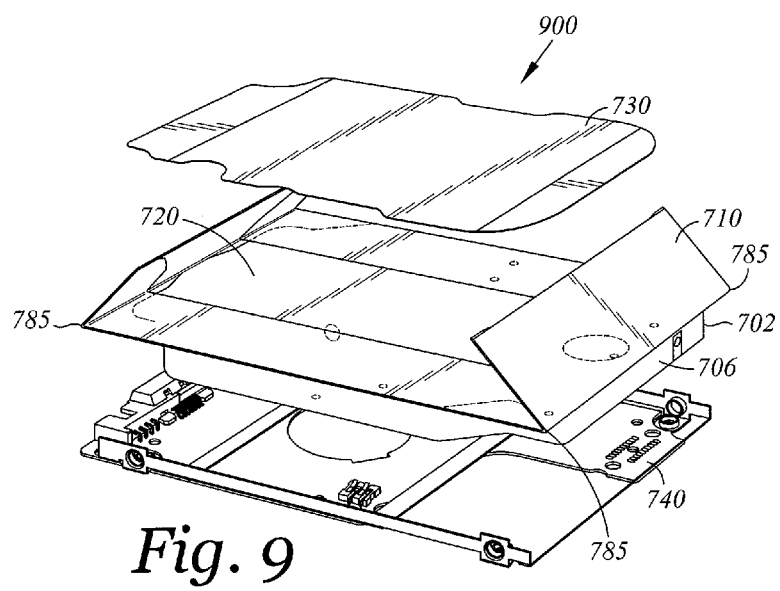
FIG. 9 is an exploded view of a disk drive according to an embodiment of the present invention.

FIG. 1 depicts a partial disk drive enclosure 100 with a peripheral flange 110 exploded from a disk drive base 102, according to an embodiment of the present invention. The disk drive base 102 has a bottom portion 104 and four side walls 106 that define a cavity 108 therebetween. Note that in this context "four side walls" means at least four side walls, so that a disk drive base that has eight side walls, for example, would also be considered to have 4 side walls herein.

FIG. 2 is a top perspective view of the partial disk drive enclosure 100, except with the peripheral flange 110 attached and hermetically sealed to the disk drive base 102. For example, the peripheral flange 110 may be welded, soldered, or brazed to the disk drive base 102 (or otherwise assembled with and hermetically sealed to the disk drive base 102). Although the peripheral flange 110 is shown in FIG. 1 to be a subcomponent that is distinct from the disk drive base 102 and then attached thereto, the peripheral flange 110 shown in FIG. 2 may alternatively be an integral protrusion from the disk drive base 102, so that the peripheral flange 110 and the disk drive base 102 are a single monolithic component having material continuity. The peripheral flange 110 preferably comprises a metal material (e.g. copper, stainless steel, aluminum, an alloy thereof), in which case it may optionally also be referred to as the "metal flange" herein.

FIG. 3 is an exploded top perspective view of a disk drive 300 according to an embodiment of the present invention, with the peripheral flange 110 protruding from all four side walls 106 of the disk drive base 102, and with a top seal 120 exploded from the peripheral flange 110. Now referring to FIGS. 1, 2, and 3, the disk drive 300 includes at least one disk 304 defining a disk axis of rotation normal to a disk major surface, and a head actuator 306 for positioning a head at desired positions over the major surface of the disk 304. The disk 304 may be rotably mounted to the disk drive base 102 either before or after the peripheral flange 110 is attached and hermetically sealed to the disk drive base 102. The disk drive base 102, a disk drive top cover 112 (also known as a "structural top cover" 112), the peripheral flange 110, and the top seal 120, together enclose the disk 304 and the head actuator 306.

In the embodiment of FIGS. 1-3, the top seal 120 includes a peripheral portion 122 that overlies each of the four side walls 106. The top seal 120 also includes a central portion 124 that spans the cavity 108. The peripheral portion 122 of the top seal 120 preferably includes a flat surface that is parallel to the major surface of the disk 304. A surface does not need to be perfectly flat to be considered "flat" in this context, but rather it needs only meet a practically achievable flatness specification such as 0.5 mm. Likewise, a surface does not need to be perfectly parallel to the major surface of the disk 304 to be considered "parallel" in this context, but rather it needs only meet a practically achievable parallelism specification such as within ±5° of perfect parallelism.

Although in the view of FIG. 3 the top seal 120 is exploded away from the peripheral flange 110 to show internal components of the disk drive 300, in the assembled disk drive 300 the top seal 120 is preferably continuously adhered to the peripheral flange 110 along an entire length of all four side walls 106. In the embodiment of FIG. 3, being "continuously adhered" implies that a sealant layer (e.g. adhesive, solder) continuously encircles the cavity 108 through which helium might otherwise escape. For example, a continuous adhesive layer in this context may comprise a thermal set epoxy, an acrylic pressure sensitive adhesive, or the like. It is not necessary for an adhesive layer to lack voids or bubbles for the top seal 120 to qualify as being "continuously adhered" to the metal flange 110 along an entire length of all four side walls 106 herein, so long as, in the embodiment of FIG. 3, such adhesive or sealant layer contiguously encircles the cavity 108.

FIG. 4 shows the disk drive 300 with the top seal 120 attached to the peripheral flange 110, and with the top seal 120 and peripheral flange 110 together folded according to an embodiment of the present invention. Specifically, now referring additionally to FIG. 4, the peripheral flange 110 and an outermost portion of the top seal 120 are together folded over the central portion 124 of the top seal 120 (and also over the top cover 112) along all four side walls 106, so that a folded portion of the metal flange 110 concludes substantially parallel with (e.g. within 10° of being perfectly parallel with) the central portion 124 of the top seal 120 (and also substantially parallel with the top cover 112).

In certain embodiments, such folding is done to enable the disk drive to achieve (or fit within) desired standard external dimensions, also known as a standard disk drive "form factor." Standard disk drive form factors include the so-called "3.5 inch" (101.6 mm×25.4 mm×146 mm), "2.5 inch" (69.85 mm×7-15 mm×100 mm), and "1.8 inch" (54 mm×8 mm×71 mm) standard disk drive form factors. When the disk drive form factor is smaller than the so-called "3.5 inch" standard disk drive form factor, then the aforedescribed folding over the top cover may be additionally advantageous, because the height of the disk drive side walls 106 may be less than the diffusion length of helium gas through the adhesive layer in that case.

In the embodiment of FIGS. 1-4, helium is introduced into the enclosure of the disk drive 300 (and therefore into the cavity 108), and then the disk drive 300 is considered to be helium-filled (i.e. encloses a substantial concentration of helium gas). This step is not necessarily sequentially the last assembly step, and may precede other assembly steps, for example if the assembly process is accomplished in an environment that includes helium. Practically, the concentration of enclosed helium gas (e.g. versus remaining air) will be less than 100% initially, and is expected to drop over the useful life of the disk drive 300.

Still, the disk drive 300 may be considered helium-filled, and/or to enclose helium, throughout its useful life so long as it continues to enclose a substantial concentration of helium gas. Note also that 1.0 atmosphere pressure of helium is not required for the disk drive 300 to be considered to enclose helium and/or be helium-filled. For example, the helium-filled disk drive enclosure preferably initially encloses helium having between 0.3 to 1.0 atmosphere partial pressure, and may also enclose air having between 0 to 0.7 atmosphere partial pressure. In certain applications, it may be desirable for at least 70% of the helium gas that is initially enclosed to remain enclosed after a 10 year useful life of the disk drive.

In certain embodiments, the top seal 120 is adhered to the peripheral flange 110 along the entire length of all four side walls 106 by a continuous adhesive layer that preferably has an adhesive layer thickness in the range 5 to 50 microns and preferably has a minimum lateral adhesive layer extent (measured parallel to the major surface of the disk 304) that is not less than 8 mm. In this context, the "minimum lateral adhesive layer extent" is the sum of the adhesive layer extent going outwards parallel to the major surface of the disk 304, plus the adhesive layer extent going backwards (because of the fold) parallel to the major surface 304, so that it represents the total minimum distance that a leaking helium molecule would have to travel (measured parallel to the major surface of the disk 304) to pass completely through the adhesive layer from inside the enclosure of disk drive 300 to outside the enclosure of disk drive 300.

In the embodiment of FIGS. 1-4, if thermal set epoxy adhesive is used in the continuous adhesive layer, then the minimum lateral adhesive layer extent is preferably at least 8 mm to sufficiently reduce the rate of helium diffusion through the continuous adhesive layer. If acrylic pressure sensitive adhesive is used in the continuous adhesive layer, then the minimum lateral adhesive layer extent is preferably at least 12 mm to sufficiently reduce the rate of helium diffusion through the continuous adhesive layer. The aforementioned dimensional ranges may serve to retain helium internal to a disk drive enclosure for a sufficient period of time to ensure adequate post-manufacture product reliability and lifetime.

FIG. 5 is a top perspective view of the disk drive 300, with a top cover label 520 exploded from the folded top seal 120 and peripheral flange 110. FIG. 6 shows the disk drive 300, except with the top cover label 520 affixed to the folded top seal 120 and peripheral flange 110. Now referring additionally to FIGS. 5 and 6, the top cover label 520 may comprise a metal foil having a thickness that is preferably in the range 12 to 150 microns, so that small pores and/or imperfections in the continuous metal foil will be unlikely to frequently pass all the way through the layer.

Alternatively, the top cover label 520 may comprise a polymer backing layer and a metal film deposited on the polymer backing layer, with the metal film having a metal film thickness in the range 0.1 to 5 microns. The top cover label 520 may include a thermal set epoxy adhesive or an acrylic pressure sensitive adhesive, for example. Such adhesive may have a thickness in the range 5 to 50 microns. Alternatively, the top cover label 520 may include two overlapping layers of continuous metal foil, so that any small pores or imperfections that exist in one of the continuous metal foil layers will be unlikely to be aligned with any small pores or imperfections in the other (overlapping) one of the continuous metal foil layers.

FIG. 7 is a top perspective view of a disk drive base 702 with a peripheral flange 710 according to another embodiment of the present invention. FIG. 8 is a bottom perspective view of the disk drive base 702. The disk drive base 702 has a bottom portion 704 and four side walls 706 that define a cavity 708 therebetween. Note that in this context "four side walls" means at least four side walls, so that even if the disk drive base 702 is considered (due to its shape) to include twelve side walls, for example, the disk drive base 702 still is considered to have 4 side walls 706.

In the embodiment of FIGS. 7 and 8, the peripheral flange 710 may be welded, soldered, or brazed to the disk drive base 702 (or otherwise assembled with and hermetically sealed to the disk drive base 702). The peripheral flange 710 may alternatively be an integral protrusion from the disk drive base 702, so that the peripheral flange 710 and the disk drive base 702 are a single monolithic component having material continuity. The peripheral flange 710 preferably comprises a metal material (e.g. copper, stainless steel, aluminum, an alloy thereof), in which case it may optionally also be referred to as the "metal flange" herein.

FIG. 9 is an exploded view of a disk drive 900 according to an embodiment of the present invention. Now referring to FIGS. 7, 8, and 9, the disk drive 900 includes the disk drive base 702 with peripheral flange 710, and a disk drive top seal 720, which enclose disk drive internal components and enclose helium. The disk drive 900 also includes a top cover label 730, and a printed circuit board assembly (PCBA) 740. The top seal 720 is preferably continuously adhered to the peripheral flange 710 along an entire length of all four side walls 706 of the disk drive base 702.

In the embodiment of FIGS. 7, 8, and 9, an outermost portion of the top seal 720 and the peripheral flange 710 are together folded over the top seal 720 along all four side walls 706, so that a folded portion of the metal flange 710 concludes substantially parallel with the top seal 720 (e.g. within 10° of being perfectly parallel with the top seal 720). The exploded view of FIG. 9 shows an intermediate stage of the folding process, where the folding is still incomplete. In certain embodiments, such folding is done to enable the disk drive to achieve (or fit within) a standard disk drive form factor. When the disk drive form factor is smaller than the so-called "3.5 inch" standard disk drive form factor, folding of the top seal over itself or over the top cover may be additionally advantageous, because the height of the disk drive side walls 706 may be less than the diffusion length of helium gas through the adhesive layer in that case.

Figure 10:
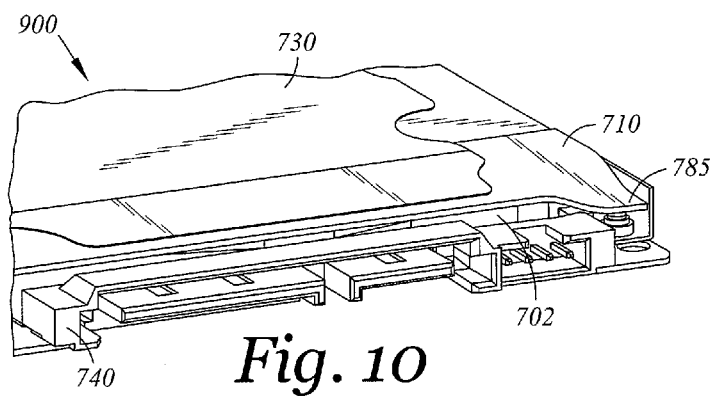
FIG. 10 shows a portion of the disk drive of FIG. 9 after assembly.

FIG. 10 shows a portion of the disk drive 900 after assembly. Now referring to FIGS. 8-10, the disk drive base 702 includes four corner recessions 775, and the folded metal flange includes four exterior corners 785. Each of the four exterior corners 785 may be bent into a corresponding one of the four corner recessions 775, as shown in FIG. 10. In certain embodiments, such bending is done to enable the disk drive 900 to achieve (or fit within) a desired standard form factor, and/or to protect the exterior corners from handling damage that might accelerate helium leakage.

Figure 11:
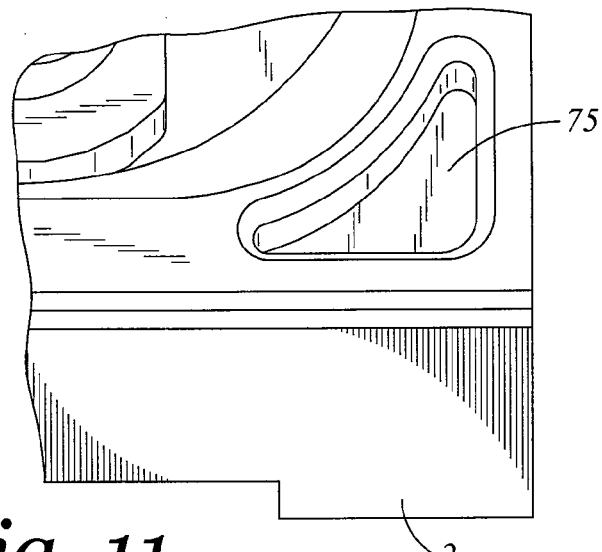
FIG. 11 depicts a portion of a disk drive base, according to an embodiment of the present invention.
Figure 12:
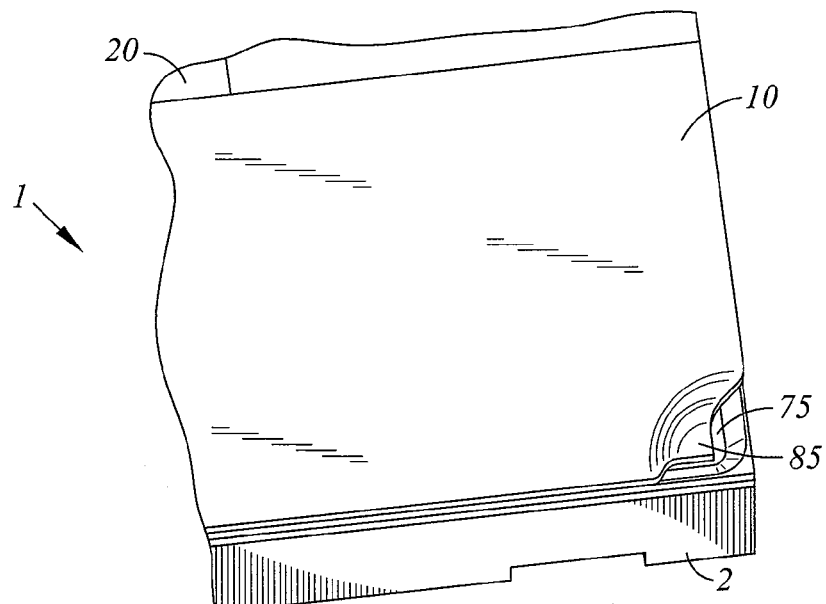
FIG. 12 shows a portion of a disk drive, according to an embodiment of the present invention.

FIG. 11 depicts a portion of a disk drive base 2, according to an embodiment of the present invention. FIG. 12 shows a portion of a disk drive 1, according to an embodiment of the present invention. Now referring to the embodiment of FIGS. 11-12, the disk drive base 2 includes a corner recession 75. The disk drive 1 includes the disk drive base 2, a top seal 20, and a folded metal flange 10 that is hermetically sealed with the top seal 20. The folded metal flange includes an exterior corner 85. In FIG. 12, the exterior corner 85 is shown to be bent into the corner recession 75. In certain embodiments, such bending is done to enable the disk drive 1 to achieve (or fit within) a desired standard form factor, and/or to protect the exterior corner from handling damage that might accelerate helium leakage.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A disk drive comprising:
   at least one disk defining a disk axis of rotation normal to a disk major surface; and
   a disk drive enclosure enclosing the disk, the disk drive enclosure including
      a disk drive base having a bottom portion and four side walls that define a cavity therebetween;
      a top seal that includes a peripheral portion that overlies each of the four side walls and a central portion that spans the cavity; and
      a metal flange that protrudes from all four side walls of the disk drive base, and is folded over the top seal along all four side walls, the top seal being continuously adhered to the metal flange along an entire length of all four side walls;
   wherein the disk drive enclosure encloses helium gas.

2. The disk drive of claim 1 wherein the peripheral portion of the top seal includes a flat surface that is parallel to the disk major surface.

3. The disk drive of claim 1 wherein the top seal is adhered to the metal flange along the entire length of all four side walls by a continuous adhesive layer having an adhesive layer thickness in the range 5 to 50 microns and a minimum lateral adhesive layer extent measured parallel to the disk major surface that is not less than 8 mm.

4. The disk drive of claim 3 wherein the continuous adhesive layer comprises a thermal set epoxy.

5. The disk drive of claim 1 wherein the metal flange comprises copper.

6. The disk drive of claim 1 wherein the folded metal flange includes at least four exterior corners, and the disk drive base includes at least four recessions, each of the at least four exterior corners being disposed within a corresponding one of the at least four recessions.

7. The disk drive of claim 1 wherein the form-factor of the disk drive is smaller than 3.5 inch form-factor.

8. The disk drive of claim 1 wherein the top seal is adhered to the metal flange along the entire length of all four side walls by a continuous solder layer.

9. The disk drive of claim 1 wherein the disk drive enclosure encloses helium gas having between 0.3 to 1.0 atmosphere partial pressure, and encloses air having between 0 to 0.7 atmosphere partial pressure.

10. The disk drive of claim 1 further comprising a disk drive top cover that spans the cavity and that is disposed between the top seal and the cavity.

11. A method to manufacture a disk drive comprising:
providing a disk drive base having a bottom portion and four side walls that define a cavity therebetween;
attaching and hermetically sealing a metal flange to the disk drive base with the metal flange positioned to protrude from all four side walls of the disk drive base;
rotably mounting at least one disk to the disk drive base, the at least one disk defining a disk axis of rotation normal to a disk major surface; and
continuously adhering a top seal to the largest exposed surface of the metal flange along an entire length of all four side walls, with the top seal spanning the cavity;
folding the metal flange over the top seal along all four side walls, so that a folded portion of the metal flange concludes substantially parallel with the top seal;
introducing helium into the cavity.

12. The method of claim 11 wherein attaching and hermetically sealing comprises welding, brazing, or soldering.

13. The method of claim 11 wherein the top seal is continuously adhered to the largest exposed surface of the metal flange along the entire length of all four side walls by a continuous adhesive layer having an adhesive layer thickness in the range 5 to 50 microns and a minimum lateral adhesive layer extent measured parallel to the disk major surface that is not less than 12 mm.

14. The method of claim 13 wherein the continuous adhesive layer comprises a thermal set epoxy or an acrylic pressure sensitive adhesive.

15. The method of claim 11 wherein the top seal is continuously adhered to the largest exposed surface of the metal flange along the entire length of all four side walls by a continuous solder layer.

16. The method of claim 11 wherein the metal flange comprises copper.

17. The method of claim 11 wherein the folded metal flange includes at least four exterior corners, and the disk drive base includes at least four recessions, and further comprising bending each of the at least four exterior corners into a corresponding one of the at least four recessions.

18. The method of claim 11 wherein providing the disk drive base comprises providing a disk drive base having a form-factor that is smaller than a 3.5 inch form-factor disk drive base.

19. The method of claim 11 wherein the metal flange is attached and hermetically sealed to the disk drive base before folding the metal flange, with the metal flange positioned so that a largest exposed surface of the metal flange is parallel to the disk major surface.

20. The method of claim 11 further comprising attaching a disk drive top cover to the disk drive base, with the disk drive top cover spanning the cavity, before the top seal is adhered to the metal flange.

* * * * *